United States Patent
Kim et al.

(10) Patent No.: US 9,354,500 B2
(45) Date of Patent: May 31, 2016

(54) SCREEN FOR REFLECTIVE PROJECTOR

(71) Applicant: LG ELECTRONICS INC., Seoul (KR)

(72) Inventors: Sungtae Kim, Seoul (KR); Seunggyu Lee, Seoul (KR); Youngsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/761,207

(22) PCT Filed: Nov. 6, 2013

(86) PCT No.: PCT/KR2013/010006
§ 371 (c)(1),
(2) Date: Jul. 15, 2015

(87) PCT Pub. No.: WO2014/163268
PCT Pub. Date: Oct. 9, 2014

(65) Prior Publication Data
US 2015/0370156 A1    Dec. 24, 2015

(30) Foreign Application Priority Data

Apr. 1, 2013    (KR) .................. 10-2013-0035218

(51) Int. Cl.
*G03B 21/602* (2014.01)
*G02B 5/02* (2006.01)
*G03B 21/60* (2014.01)
*G02B 1/14* (2015.01)
*G02B 1/04* (2006.01)
*G02B 5/00* (2006.01)
*G02B 27/22* (2006.01)

(52) U.S. Cl.
CPC ............... *G03B 21/602* (2013.01); *G02B 1/04* (2013.01); *G02B 1/14* (2015.01); *G02B 5/003* (2013.01); *G02B 5/0257* (2013.01); *G02B 5/0284* (2013.01); *G02B 27/2214* (2013.01); *G03B 21/60* (2013.01); *G02B 2207/123* (2013.01)

(58) Field of Classification Search
CPC ..... G03G 21/60; G03G 21/56; G03G 21/602; G02B 5/0257
USPC .................................................. 359/459, 449
See application file for complete search history.

(56) References Cited

U.S. PATENT DOCUMENTS 9,030,736 B2 * 5/2015 Sadahiro ............... G03B 21/60
                                                                    359/449
2011/0085108 A1    4/2011 Park et al.

FOREIGN PATENT DOCUMENTS

| JP | 2006-215063 A | 8/2006 | |
| JP | 2008-181046 A | 8/2008 | |
| JP | 2009271263 A | * 11/2009 | ............. G03G 21/60 |
| JP | 2010-128447 A | 6/2010 | |
| KR | 2003-0061690 A | 7/2003 | |
| KR | 10-0985733 B1 | 10/2010 | |

* cited by examiner

*Primary Examiner* — Christopher Mahoney
(74) *Attorney, Agent, or Firm* — Birch, Stewart, Kolasch & Birch, LLP

(57) ABSTRACT

A screen for displaying an image received from a projector includes an anisotropic base diffusion layer having a fine pattern; a lens layer formed on a rear surface of the anisotropic base diffusion layer; a reflection layer deposited on a rear surface of the lens layer; and a surface protection layer coupled with a front surface of the anisotropic base diffusion layer. The screen for a projector enables a viewer to view an image from a single focus projector inside a bright room, brightness to be uniformly distributed throughout the screen, and a desirable viewing angle to be obtained.

18 Claims, 6 Drawing Sheets

(a)

(b)

SCREEN FOR REFLECTIVE PROJECTOR

BACKGROUND OF THE INVENTION

1. Technical Field

The present invention relates to a screen for reflective projectors.

2. Background Art

A projector projects an image to a screen and a user views the image reflected by the screen. Here, since an angle of incidence and an angle of reflection are symmetrical, when a conventional projector emitting an image at a long distance is used, the image emitted by the projector may be reflected by a screen and transmitted to a user.

However, in the case of a monofocal projector emitting an image at a short distance, the image is incident upon a screen from a short distance from the screen and thus, an angle of incidence is greater than the angle of incidence of the conventional projector. If an angle of incidence is great, an angle of reflection is great and thus, most light is not reflected toward user's eyes but is reflected toward the ceiling and a user views a dark image, and, in the case of a 3D image, an angle of reflection of the 3D image deviates from the position of 3D glasses and it is impossible for a user to view the 3D image.

Particularly, if a conventional screen is used in a monofocal projector, lowering of contrast in a bright indoor space, non-uniformity of distribution of front surface brightness, and difficulty in securing a wide viewing angle are generated and, thus, common use of the screen is restricted.

SUMMARY OF THE INVENTION

An object of the present invention is to provide a screen for projectors which may be watched in a bright indoor place and used in a 3D projector.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In one embodiment of the present invention, a screen for projectors for displaying an image received from a projector, including an anisotropic base diffusion layer provided with fine patterns formed thereon, a lens layer formed on the rear surface of the anisotropic base diffusion layer, a reflective layer deposited on the rear surface of the lens layer, and a surface protective layer coupled with the front surface of the anisotropic base diffusion layer.

The anisotropic base diffusion layer may have small change of a retardation value according to angles of incidence of the image received from the projector.

The anisotropic base diffusion layer may have a retardation value of 10 nm or less if the angle of incidence of the image received from the projector is 50°, or a retardation value difference of 5 nm or less if the angles of incidence of the image received from the projector are 0° and 50°.

The anisotropic base diffusion layer may be a polymethylmethacrylate (PMMA) film.

The polymethylmethacrylate (PMMA) film may be manufactured by solution casting.

The anisotropic base diffusion layer may include a plurality of unit layers having parallel fine patterns with a designated pitch, and the fine pattern formed on one unit layer may intersect the fine pattern formed on at least another unit layer.

The anisotropic base diffusion layer may include two unit layers.

The lens layer or the surface protective layer may include a black material.

The black material may be carbon black.

The surface protective layer may include an anisotropic base diffusion layer for the surface protective layer and a surface protective coating layer formed on the front surface of the anisotropic base diffusion layer for the surface protective layer.

The anisotropic base diffusion layer and the surface protective layer may be bonded using an adhesive and the adhesive may be a black primer.

The lens layer may be a Fresnel lens provided with a rear surface portion segmented into a plurality of surfaces.

The lens layer may be formed of a thermosetting resin or an ultraviolet-curable resin on the rear surface of the anisotropic base diffusion layer.

The reflective layer may include black pearls.

A screen for projectors in accordance with the present invention allows a user to watch a monofocal projector in a bright indoor place and secures uniform distribution of brightness throughout the screen and a viewing angle.

Further, since a diffusion sheet is omitted and, thus, a cross torque value decreases, the screen may be used as a screen for passive type 3D projectors.

Effects obtained by the present invention are not limited to the above-described effects, and other effects which are not described will be apparent to those skilled in the art based on the following description.

DETAILED DESCRIPTION OF THE EMBODIMENTS

Hereinafter, a mobile terminal in accordance with the present invention will be described in detail with reference to the accompanying drawings. The suffixes "module" and "unit" in elements used in the description below are given or used together only in consideration of ease in preparation of the specification and do not have distinctive meanings or functions.

Figure 1:
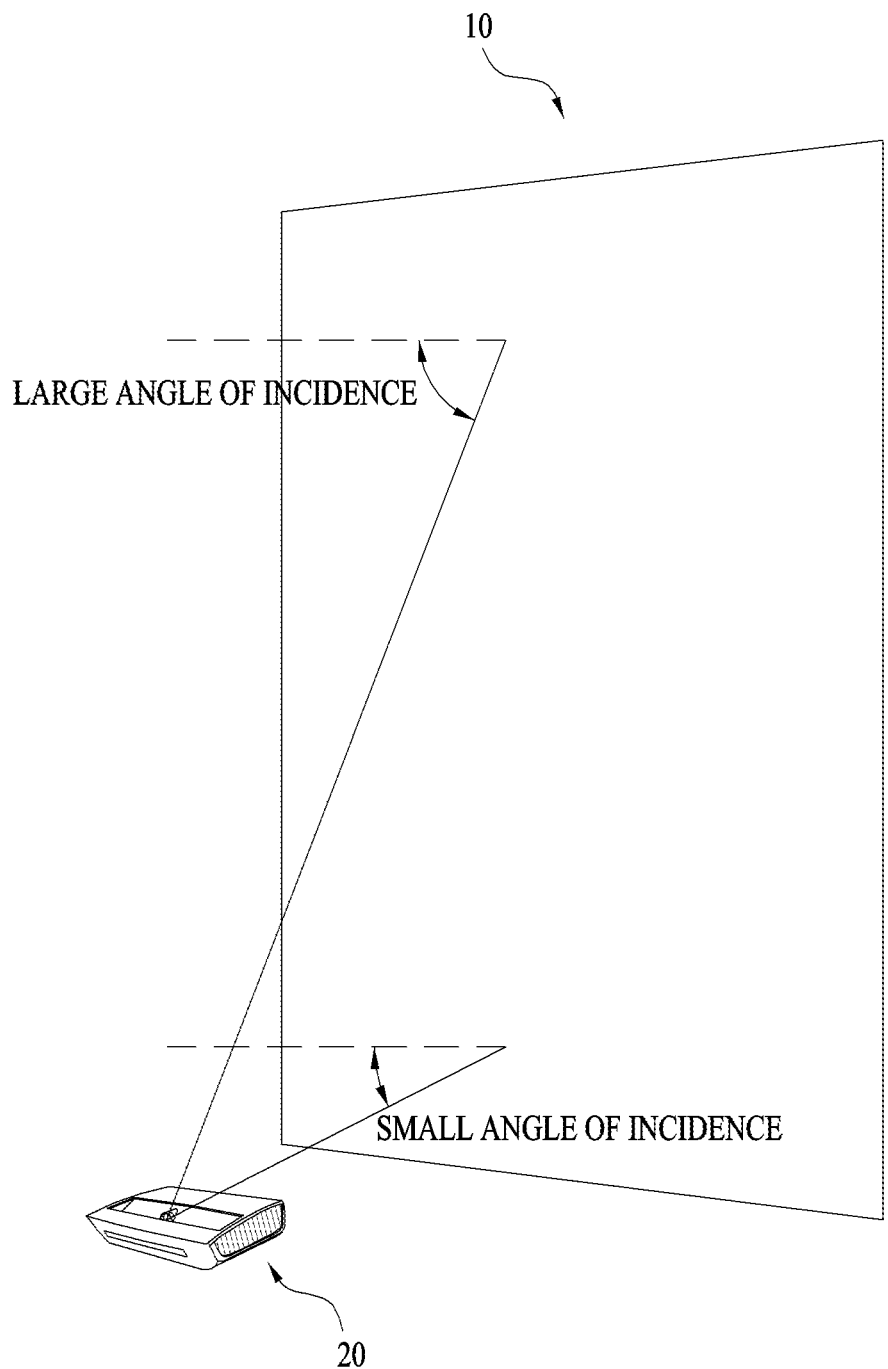
FIG. 1 is a view illustrating a screen for projectors in accordance with the present invention in use.

FIG. 1 is a view illustrating a screen 10 for projectors in accordance with the present invention in use, and a monofocal projector 20 projects an image at a short distance from the screen. Although this figure illustrates the monofocal projector 20 and the screen 10 separately, a display type in which the projector 20 is fixed to the lower end of the screen 10 may be implemented.

If the monofocal projector 20 projects an image at a short distance, there is a large difference between angles of incidence at the upper and lower regions of the screen 10, as shown in the figure. An image incident upon the screen 10 is reflected by the screen 10 and then enters user's eyes. When there is a large difference between angles of incidence at the upper and lower regions of the screen 10, the reflection path of light is directed to the ceiling not the user's eyes and, thus, an amount of light reaching the user's eyes decreases.

Therefore, light may be reflected in the forward direction and, thus, the reflected light may move to the user's eyes, only if a reflective surface of the screen 10 for monofocal projectors faces down. The entirety of the screen 10 may be tilted in the forward direction so that light emitted by the projector 20 may be reflected by the reflective surface and thus reach the user's eyes located at the front. However, it is difficult to install the screen 10, the reflective surface of which is tilted downwards and, thus, as exemplarily shown in FIG. 2, which is a longitudinal-sectional view of a screen for projectors in accordance with one embodiment of the present invention, a Fresnel lens which is divided into a plurality of surfaces may be used.

Figure 3:
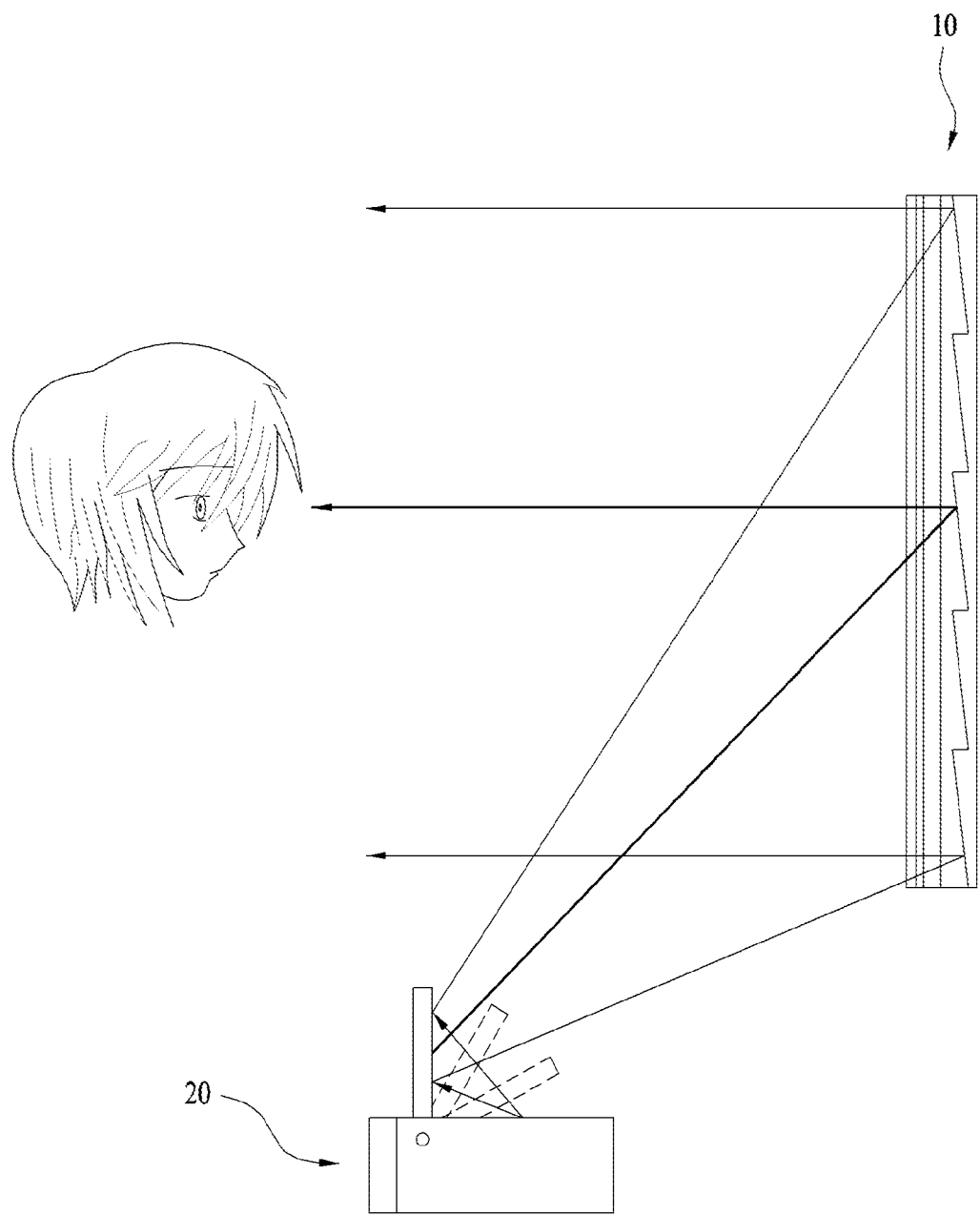
FIG. 3 is a longitudinal-sectional view of the screen for projectors in accordance with one embodiment of the present invention.

FIG. 3 illustrates a reflection path if a lens layer 13 includes a Fresnel lens 13 and, here, an image emitted from the lower region may be reflected by the Fresnel lens 13 having a plurality of reflective surfaces tilted in the forward-downward direction and be incident upon viewer's eyes.

The Fresnel lens 13 serves to reduce the thickness of a curved lens and is characterized in that the surface of a curved lens is divided into planar surfaces. The cross-section of the Fresnel lens 13 has a saw-toothed shape, as exemplarily shown in FIG. 2. Although the Fresnel lens may be formed in a circular shape about a concentric circle, in this embodiment, a linear-type Fresnel lens 13 in which a plurality of surfaces facing in the downward direction is formed in parallel may be used.

Figure 6:
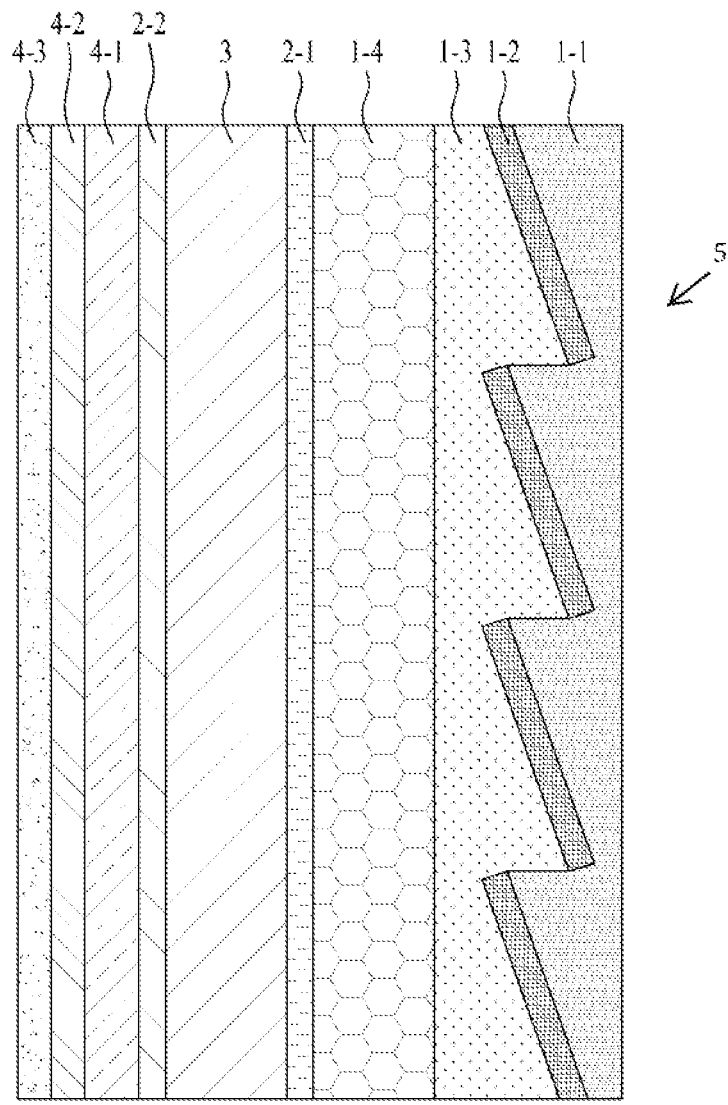
FIG. 6 is a longitudinal-sectional view of a conventional screen for projectors.

FIG. 6 is a longitudinal-sectional view of a conventional screen 5 for projectors. With reference to FIG. 6, a layered structure including a rear coating layer 1-1, a reflective surface 1-2, a lens layer 1-3, a base layer 1-4, an adhesive layer 2-1, an isotropic diffusion layer 3, an adhesive layer 2-2, a base layer 4-1, a black layer 4-2 and a front coating layer 4-3 is provided.

In the conventional screen 5 for projectors, the lens layer 1-3 is formed on the base layer 1-4, the reflective layer 1-2 is applied thereto, the rear coating layer 1-1 is formed as a first layer to protect the reflective layer, the isotropic diffusion layer 3 is attached to the base layer 1-4 located on the front surface of the first layer using the adhesive layer 2-1, and surface protective layers 4-1, 4-2 and 4-3 including the black layer 4-2 to protect the front surface of the screen 5 for projectors and to produce a clear image is attached thereto using the adhesive layer 2-2.

In such a conventional structure in which several layers are stacked, as the number of the stacked layers increases, an angle of refraction varies according to an angle of incidence and an image reflected by the screen is severely distorted. If a difference between an angle of incidence of light incident upon the upper portion of the screen from the projector 20 and an angle of incidence of light incident upon the lower portion of the screen from the projector 20 is great as in the present invention, distortion becomes more severe and, thus, the conventional complicated layered structure needs to be simplified.

Figure 2:
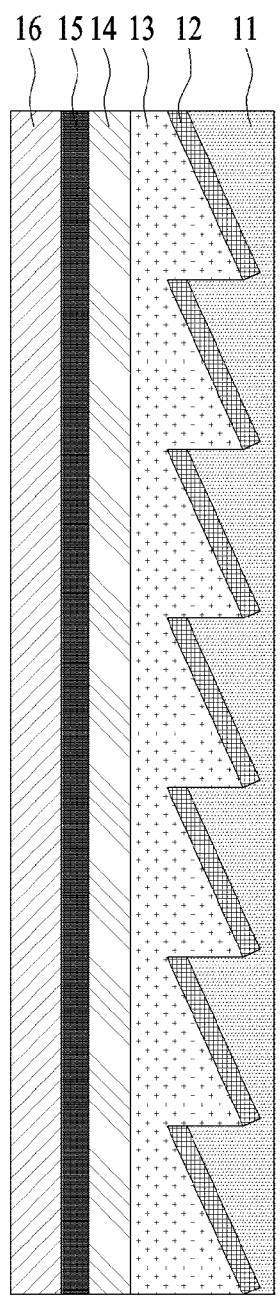
FIG. 2 is a longitudinal-sectional view of a screen for projectors in accordance with one embodiment of the present invention.

FIG. 2 is a longitudinal-sectional view of a screen for projectors in accordance with one embodiment of the present invention. The screen of the present invention has a layered structure including a plurality of layers. The layered structure includes a rear coating layer 11, a reflective layer 12, a lens layer 13, an anisotropic base diffusion layer 14, an adhesive layer 15 and a surface protective layer 16. Only one adhesive layer may be used by omitting the conventional isotropic diffusion layer 3, and a simple layered structure may be obtained by eliminating the black layer 4-2 from the conventional surface protective layers 4-1, 4-2 and 4-3.

Hereinafter, the configuration of the present invention will be described in more detail with reference to FIG. 2.

The lens layer 13 may be formed on the anisotropic base diffusion layer 14. The lens layer 13 is formed of a resin, such as an ultraviolet-curable resin or a thermosetting resin, and thus, requires a base layer. However, since the anisotropic base diffusion layer 14 of the present invention, serving as a base when the lens layer 13 is formed, is located on the front surface of the lens layer 13, as exemplarily shown in FIG. 2, the anisotropic base diffusion layer 14 influences a path of light which is incident upon and reflected by the screen 10.

A degree of distortion of light incident upon of reflected by the lens layer 13 is determined by a retardation value of the anisotropic base diffusion layer 14 according to refraction of light. Retardation is a phenomenon in which the velocity of light in a specific medium varies and, thus, differs from the velocity of light in the air, and such a velocity difference varies according to an angle of incidence. As an angle of incidence increases, resistance to a medium increases and a retardation value increases.

In the case of a screen for projectors separated by a large distance from the screen and emitting light, an angle of incidence is almost uniform regardless of the position of the screen. Therefore, only a retardation value at an angle of incidence of 0° is measured and a material having a small retardation value at an angle of incidence of 0° is used.

Figure 4:
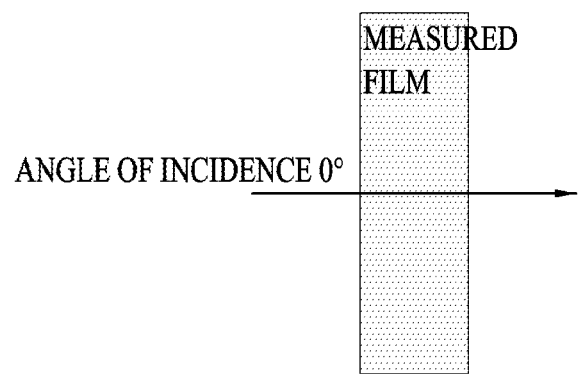
FIG. 4 is a conceptual view illustrating a measured angle to measure retardation of a screen for projectors.
Figure 4:
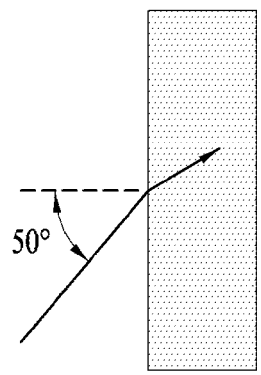

However, in the screen 10 for monofocal projectors in accordance with the present invention, a difference between an angle of incidence at the upper portion of the screen 10 and an angle of incidence at the lower portion of the screen 10 is great, as exemplarily shown in FIG. 1. Therefore, referring to FIG. 4, by measuring a retardation value at an angle of incidence of 0° (a) and a retardation value at an angle of incidence of 50° (b) and comparing the measured retardation values, a clear image having a high quality may be obtained using a material having a small retardation value which is less changed even if the angle of incidence is changed.

[Table 1] states retardation values according to thicknesses of polycarbonate, which is a representative thermosetting resin, and angles of incident light.

TABLE 1

| Film kind | Thickness (μm) | Retardation value (nm) at angle of incidence of 0° | Retardation value (nm) at angle of incidence of 50° |
|---|---|---|---|
| Polycarbonate | 80 | 4 | 38 |
| | 150 | 5 | 50 |

In the case of polycarbonate, when light is incident upon a polycarbonate layer having a thickness of 80 μm at an angle of 0°, a retardation value of 4 nm is obtained and, when light is incident upon the polycarbonate layer having a thickness of 80 μm at an angle of 50°, a retardation value of 38 nm is obtained, thus causing a great retardation value difference. Such a difference increases as the thickness of the polycarbonate layer increases.

When light is incident upon a polycarbonate layer having a thickness of 150 μm at an angle of 0°, a retardation value of 5 nm is obtained and, when light is incident upon the polycarbonate layer having a thickness of 150 μm at an angle of 50°, a retardation value of 50 nm is obtained, thus causing a greater retardation value difference. Polycarbonate may be used as a base layer of a screen for projectors emitting light at a long distance but is not proper as a base layer of the screen 10 for monofocal projectors having a great difference of angles of incidence.

Therefore, in the present invention, the anisotropic base diffusion layer 14 is formed using a material having a small retardation value difference according to angles of incident light. For example, polymethylmethacrylate (PMMA) may be used as a material having a small retardation value difference according to angles of incident light.

When PMMA is manufactured into a film type, as stress is minimized, a retardation value may decrease. When an anisotropic base diffusion layer is formed using a manufacturing method without applying stress, such as solution casting in which a film is formed by applying a solution, a retardation value may further decrease.

Table 2 states retardation values according to thicknesses of PMMA and angles of incident light.

TABLE 2

| Film kind | Thickness (μm) | Retardation value (nm) at angle of incidence of 0° | Retardation value (nm) at angle of incidence of 50° |
|---|---|---|---|
| PMMA | 40 | 4.3 | 4.7 |
|  | 400 | 2 | 38 |

With reference to Table 2, when a PMMA layer has a thickness of 40 μm, there is no retardation value difference even if light is incident upon the polycarbonate layer at angles of 0° and 50°. However, when the thickness of the PMMA layer increases, there is a retardation value difference according to angles of incidences.

The anisotropic base diffusion layer 14 in accordance with the present invention uses a material, the retardation value of which is small according to angles of incident light, but, if an angle of incidence increases as the thickness of the anisotropic base diffusion layer 14 increases, the retardation value increases and, thus, the thickness of the screen 10 needs to be reduced.

As exemplarily shown in FIG. 6, conventionally, the isotropic diffusion layer 3 is attached to the front surface of the lens layer 1-3. The isotropic diffusion layer 3 serves to secure a viewing angle, and securing of the viewing angle means that a user may view an image emitted from the screen 10 even if the user watches the screen 10 from an oblique angle.

Therefore, efficiency of the screen is good as a viewing angle thereof increases but, when the isotropic diffusion layer 3 is stacked on the front surface of the lens layer 1-3, as in the conventional screen 5 shown in FIG. 6, so as to increase the viewing angle, a retardation value increases and, thus, the screen 5 may be difficult to use as a screen for 3D projectors.

Particularly, in the case of a 3D projector 20, an image incident upon a left eye of a user and an image incident upon a right eye of the user should not be mixed. However, the isotropic diffusion layer 3 used in the conventional screen 5 scatters light and an image for a left eye may be incident upon a right eye (hereinafter, this will be referred to as 'crosstalk').

In the present invention, in order to minimize crosstalk, the isotropic diffusion layer 3 is omitted and fine patterns to secure a viewing angle may be formed on the anisotropic base diffusion layer 14. The fine patterns secure a viewing angle by scattering light but prevent crosstalk by scattering light only in a specific direction. That is, the fine patterns do not scatter incident light in all directions but scatters incident light only in a direction to secure a viewing angle, thus being capable of minimizing crosstalk and securing the viewing angle.

Figure 5:
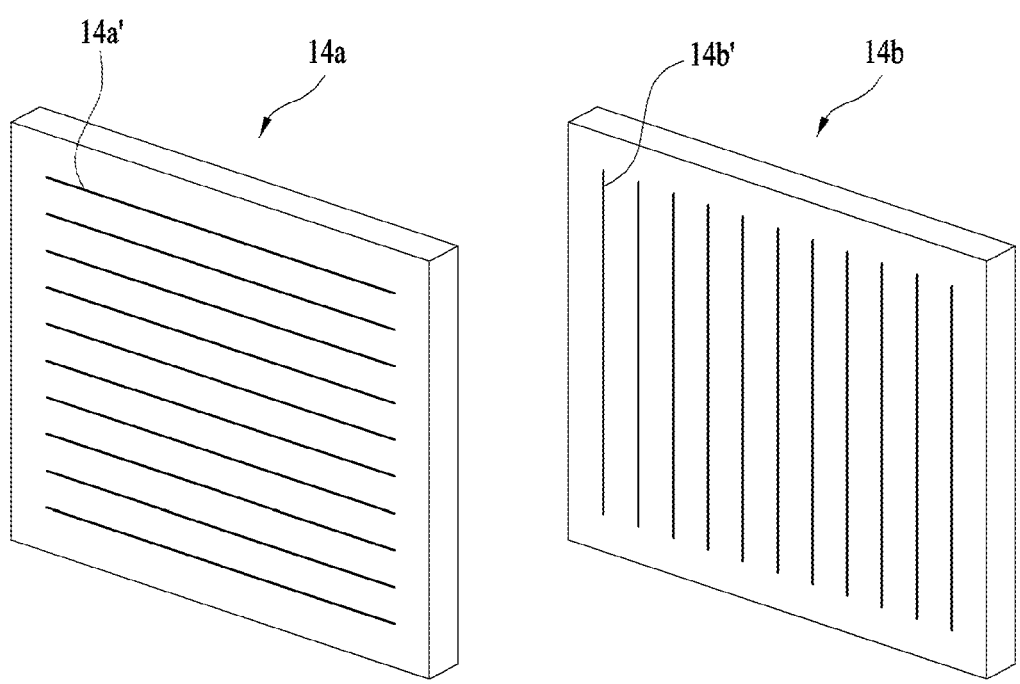
FIG. 5 is an exploded perspective view of a layered structure of an anisotropic base diffusion layer of a screen for projectors in accordance with one embodiment of the present invention.

FIG. 5 is an exploded perspective view of a layered structure of the anisotropic base diffusion layer 14 and the anisotropic base diffusion layer 14 includes a plurality of stacked unit layers 14a and 14b. Fine patterns 14a' and 14b' separated from each other by designated intervals and disposed in parallel are formed on the respective unit layers 14a and 14b. These fine patterns 14a' and 14b' scatter light only in a specific direction, thus being capable of minimizing crosstalk and securing a viewing angle.

The directions of the fine patterns 14a' and 14b' formed on the respective unit layers 14a and 14b are different, one of the fine patterns 14a' and 14b is a horizontal fine pattern and the other of the fine patterns 14a' and 14b' is a vertical fine pattern, and the patterns intersect when the horizontal unit layer 14a and the vertical unit layer 14b are stacked. Here, the horizontal fine pattern 14a' is not always arranged in the horizontal direction and the vertical fine pattern 14b' is not always arranged in the vertical direction. That is, these fine patterns may be tilted in oblique directions.

A degree of diffusion may be controlled by adjusting the pitch and width of the fine patterns 14a' and 14b'. The width of the fine patterns 14a' and 14b' may be formed within the range of 200 nm to 1,000 nm, and the pitch of the fine patterns 14a' and 14b' may be formed within the range of about 5 μm to about 50 μm. The width and pitch of the fine patterns 14a' and 14b' may be different according to thicknesses and physical characteristics, such as a retardation value, of other members.

Patterning may be carried out by forming the fine patterns 14a' and 14b' by engraving or embossing figures corresponding to the fine patterns 14a' and 14b' on a mold when the unit layers 14a and 14b are formed, engraving the fine patterns 14a' and 14b' using a laser, or inserting louver structures into the unit layers 14a and 14b.

Although this figure illustrates two unit layers 14a and 14b, a horizontal layer and a vertical layer are stacked so as to form a set and, thus, the unit layers 14a and 14b may be prepared in an even number, such as four or six. However, as the number of the unit layers 14a and 14b increases, the thickness of the anisotropic base diffusion layer 14 increases and a retardation value increases, as described above. Therefore, in order to minimize a retardation value, two unit layers 14a and 14b may be stacked to form the anisotropic base diffusion layer 14.

The lens layer 13 formed on the anisotropic base diffusion layer 14 may include a black material, such as carbon black. Since contrast increases and a clear picture may be produced if the background of an image is black, the independent black layer 4-2 is conventionally stacked, as exemplarily shown in FIG. 6. However, this increases the number of layers of the layered structure and causes increase of a retardation value and, thus, the conventional black layer 4-2 is omitted and a black material is included in the lens layer 13, when the lens layer 13 is manufactured, so as to function as the conventional black layer 4-2.

The lens layer 13 includes a plurality of surfaces segmented from the rear surface thereof, and a reflective layer to reflect light is formed on the rear surface of the lens layer 13.

The reflective layer may employ a mirror film and contain black pearls to increase contrast together with reflection performance. The rear coating layer 11 may be formed on the rear surface of the reflective layer so as to prevent damage to the reflective layer.

The surface protective layer 16 is stacked on the front surface of the anisotropic base diffusion layer 14 so as to prevent damage to the patterns formed on the anisotropic base diffusion layer 14. The surface protective layer 16 may be formed through a coating method or a film stacking method. However, since the surface protective layer 16 formed as thin as possible may reduce a retardation value, the film stacking method rather than the coating method may form a thinner surface protective layer 16.

Since the surface protective layer 16 needs to have a small difference between retardation values according to angles of incidence, the surface protective layer 16 may be formed of a material for the anisotropic base diffusion layer 14, such as PMMA. For example, the surface protective layer 16 may include a base layer for the surface protective layer 16 formed of the same material as the material for the anisotropic base diffusion layer 14 and a surface protective coating layer applied to the base layer.

The adhesive layer 15 may be used to stack the surface protective layer 16 on the anisotropic base diffusion layer 14. If the lens layer 13 does not include a black material, the adhesive layer 15 may be blackened using a member which has a thin thickness, less change of a retardation value according to angles of incidence and a small retardation value, such as a black primer layer.

As described above, a screen for projectors in accordance with the present invention may allow a viewer to watch a monofocal projector in a bright indoor space, uniformize distribution of brightness in the screen, and secure a viewing angle.

Further, since an isotropic diffusion sheet is omitted and a small crosstalk value is obtained, the screen for projectors in accordance with the present invention may be used as a screen for passive type 3D projectors.

It will be apparent to those skilled in the art that various modifications and variations can be made in the present invention without departing from the spirit or scope of the invention.

Thus, it is intended that the present invention cover the modifications and variations of this invention provided they come within the scope of the appended claims and their equivalents.

The invention claimed is:

1. A projection screen for displaying an image received from a projector, comprising:
    an anisotropic base diffusion layer;
    fine patterns provided on the anisotropic base diffusion layer;
    a lens layer provided at a rear surface of the anisotropic base diffusion layer; and
    a reflective layer provided at a rear surface of the lens layer,
    wherein the anisotropic base diffusion layer includes a plurality of unit layers having the fine patterns,
    wherein the fine patterns each comprise a parallel fine pattern with a designated pitch, and
    wherein the fine pattern formed on one unit layer intersects the fine pattern formed on at least another unit layer.

2. The projection screen according to claim 1, wherein the anisotropic base diffusion layer has a retardation value of 10 nm or less where the angle of incidence of the image projected onto the projection screen is 50°.

3. The projection screen according to claim 1, wherein the anisotropic base diffusion layer has a retardation value difference of 5 nm or less where the angles of incidence of the image projected onto the projection screen are 0° and 50°.

4. The projection screen according to claim 1, wherein the anisotropic base diffusion layer is a polymethylmethacrylate (PMMA) film.

5. The projection screen according to claim 4, wherein the polymethylmethacrylate (PMMA) film is a solution casting.

6. The projection screen according to claim 1, wherein the anisotropic base diffusion layer includes two unit layers.

7. The projection screen according to claim 1, wherein the lens layer includes a black material.

8. The projection screen according to claim 7, wherein the black material is carbon black.

9. The projection screen according to claim 1, further comprising a surface protective layer provided at a front surface of the anisotropic base diffusion layer.

10. The projection screen according to claim 9, wherein the surface protective layer includes:
    an anisotropic base diffusion layer for the surface protective layer; and
    a surface protective coating layer formed on a front surface of the anisotropic base diffusion layer for the surface protective layer.

11. The projection screen according to claim 9, wherein the anisotropic base diffusion layer and the surface protective layer are bonded using an adhesive, and
    wherein the adhesive is a black primer.

12. The projection screen according to claim 9, wherein the surface protective layer includes a black material.

13. The projection screen according to claim 12, wherein the black material is carbon black.

14. The projection screen according to claim 1, wherein the lens layer is a Fresnel lens provided with a rear surface portion segmented into a plurality of surfaces.

15. The projection screen according to claim 1, wherein the lens layer is a thermosetting resin or an ultraviolet-curable resin.

16. The projection screen according to claim 1, wherein the reflective layer includes black pearls.

17. The projection screen according to claim 1, wherein the fine patterns provided on the anisotropic base diffusion layer have a width within a range of 200 nm to 1,000 nm, and a pitch within a range of about 5 μm to about 50 μm.

18. A projection screen for displaying an image received from a projector, comprising:
    a polymethylmethacrylate anisotropic base diffusion layer having a first unit layer and a second unit layer;
    a first parallel fine pattern provided on the first unit layer, and a second parallel fine pattern provided on the second unit layer, the second parallel fine pattern intersecting the first parallel fine pattern, wherein the first parallel fine pattern and the second parallel fine pattern each have a width within a range of 200 nm to 1,000 nm and a pitch within a range of about 5 μm to about 50 μm;
    a lens layer provided at a rear surface of the anisotropic base diffusion layer;
    a reflective layer provided at a rear surface of the lens layer; and
    a surface protective layer provided at a front surface of the anisotropic base diffusion layer,
    wherein the anisotropic base diffusion layer has a retardation value of 10 nm or less where the angle of incidence of the image projected onto the projection screen is 50°, and wherein the anisotropic base diffusion layer has a retardation value difference of 5 nm or less where the angles of incidence of the image projected onto the projection screen are 0° and 50°.

* * * * *